Figure 3:
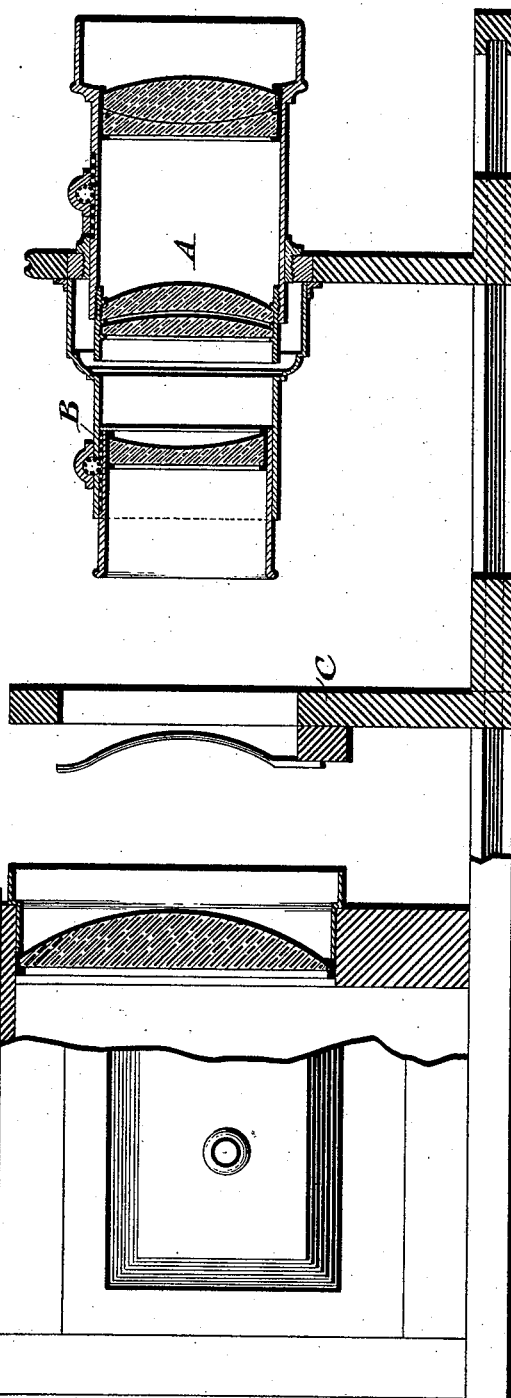

(No Model.)  2 Sheets—Sheet 1.
O. KNIPE.
PROJECTING OR OPTICAL LANTERN.
No. 465,409. Patented Dec. 15, 1891.
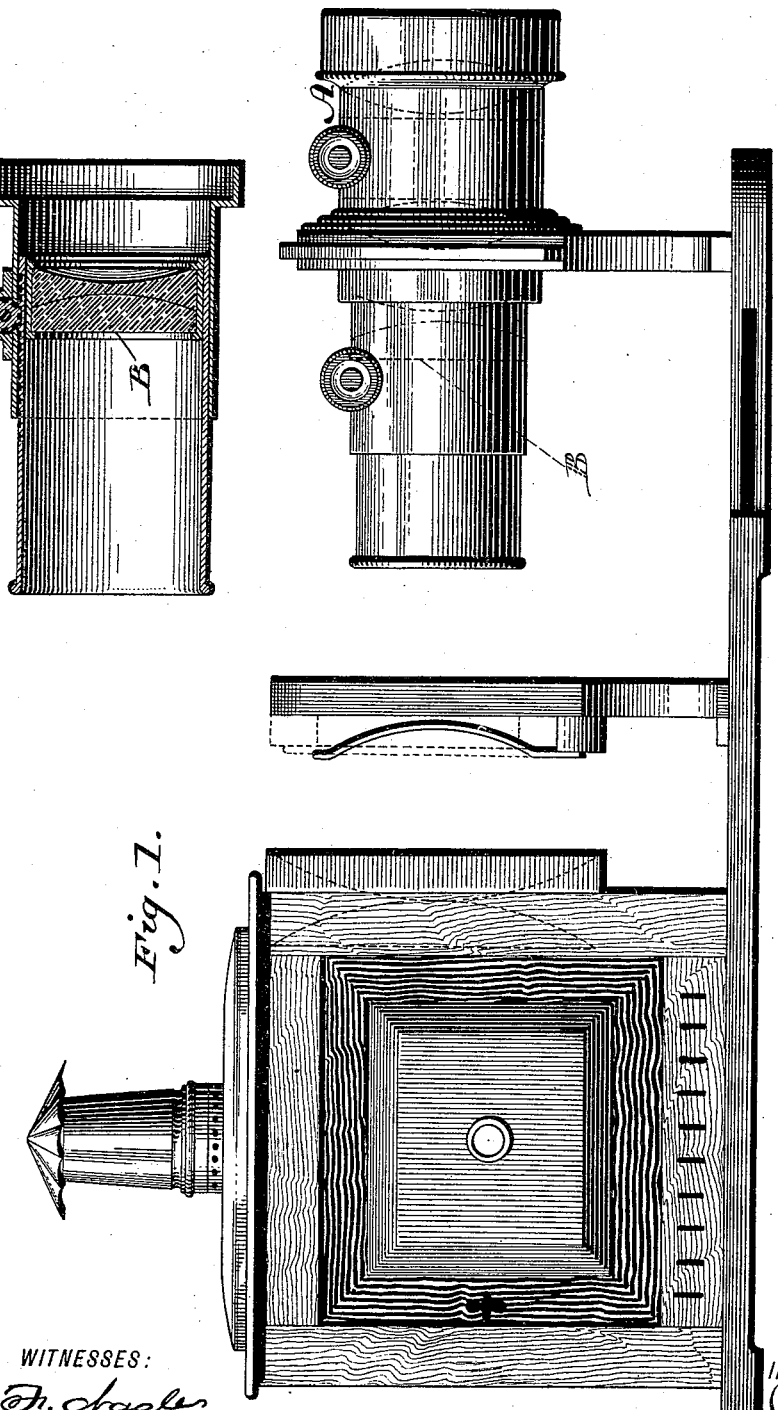
WITNESSES:
INVENTOR
Oscar Knipe
BY
ATTORNEY.

(No Model.) 2 Sheets—Sheet 2.

O. KNIPE.
PROJECTING OR OPTICAL LANTERN.

No. 465,409. Patented Dec. 15, 1891.

WITNESSES:
P. F. Eagle.
W<sup>m</sup> E. Wiedersheim.

INVENTOR
Oscar Knipe
BY
John E. Wiedersheim
ATTORNEY.

UNITED STATES PATENT OFFICE.

OSCAR KNIPE, OF PHILADELPHIA, PENNSYLVANIA, ASSIGNOR TO QUEEN & CO., OF SAME PLACE.

PROJECTING OR OPTICAL LANTERN.

SPECIFICATION forming part of Letters Patent No. 465,409, dated December 15, 1891.

Application filed May 18, 1891. Serial No. 393,098. (No model.)

*To all whom it may concern:*

Be it known that I, OSCAR KNIPE, a citizen of the United States, residing in the city and county of Philadelphia, State of Pennsylvania, have invented a new and useful Improvement in Projecting or Optical Lanterns, which improvement is fully set forth in the following specification and accompanying drawings.

It is well known to teachers and others that the objective used in the best optical lanterns does not permit any change of distance from the screen without altering the dimension of the projected picture, which would become twice the diameter if the distance between the lantern and screen were doubled. It has been proposed to remove the back lens of the objective and use the longer focus front lens alone to work at long distance, and others employ an extra lens in exchange for those of the objective; but when it is considered that the clearness and precision depends on a mathematical combination of the two lenses composing an objective it is also obvious that any such changes destroy the corrections made by the optician.

My invention consists of the combination of parts hereinafter described.

Figure 1 represents a side elevation of a projecting lantern embodying my invention. Fig. 2 represents a longitudinal section of the detached part. Fig. 3 represents a vertical sectional view of the device shown in Fig. 1.

Similar letters of reference indicate corresponding parts in all the figures.

Referring to the drawings, A designates the ordinary objective of a projecting lantern, and B designates a concave achromatic reducing-lens, which is placed behind said objective and adjustably supported in any suitable manner. The objective is thus composed of three lenses—viz., the two lenses, as usual, and the reducing-lens added thereto at the rear thereof, and consequently located in front of the picture-holder C, which is also adjustably supported, the reducing-lens being also adjustable in relation to the other two lenses of the objective. It will be seen that by the use of the lens B an image produced on a screen may be reduced to any desired diameter—as, for instance, if an ordinary objective produces a picture of twelve feet at a distance of forty feet, it would make a picture of eighteen feet at a distance of sixty feet; but by the use of the reducing-lens the picture would appear only twelve feet at a distance of sixty feet. It will be noticed that the objective is not changed, the reducing-lens being relied upon to make the diameter of the picture, while the ratio of increase will remain the same for increased distance. Without the use of the reducing-lens it would be necessary to employ objectives of different powers in order to obtain the same result.

Having thus described my invention, what I claim as new, and desire to secure by Letters Patent, is—

1. In a projecting lantern, the combination of two lenses ordinarily forming the objective of the lantern and adjustable relatively to each other and to the condenser of the lantern, and a single achromatic lens intermediate of the picture-holder and the said two lenses adjustable to and from said condenser, substantially as and for the purpose set forth.

2. In a projecting lantern, the combination of two lenses adjustable relatively to each other, a picture-holder adjustable to and from the condenser of the lantern, and an achromatic lens supported between the said lenses and the picture-holder and adjustable relatively to said lenses and picture-holder, substantially as and for the purpose set forth.

3. In a projecting lantern, the combination of two lenses adjustable relatively to each other and to the condenser of the lantern, a single achromatic lens supported by and adjustable on the holder of the said two lenses, and a picture-holder intermediate of said achromatic lens and the condenser and adjustable between the same, said parts being combined substantially as described.

OSCAR KNIPE.

Witnesses:
JOHN A. WIEDERSHEIM,
L. JENNINGS.